UNITED STATES PATENT OFFICE.

MIGUEL DE LA VEGA AND LUIZ D'OLIVEIRA, OF NEW YORK, N. Y.

FABRICATION OF SUGAR.

SPECIFICATION forming part of Letters Patent No. 235,345, dated December 14, 1880.

Application filed July 8, 1880. (No specimens.)

*To all whom it may concern:*

Be it known that we, MIGUEL DE LA VEGA, a citizen of the United States, residing in the city, county, and State of New York, and LUIZ D'OLIVEIRA, a citizen of Portugal, residing in the city, county, and State of New York, have invented certain new and useful Improvements in the Fabrication of Sugar; and we do hereby declare that the following is a full, clear, and exact description of the invention, which will enable others skilled in the art to which it appertains to make and use the same.

Our process for the fabrication of sugar and concentration of molasses is as follows: After extracting the liquid of the sugar-cane or the liquid of any other plant or material now used in the fabrication of sugar, the liquid so produced is clarified either in a hot or cold state by means of filtration. After being clarified the liquid is placed in a proper vessel or receptacle and this vessel or receptacle placed in any proper apparatus of refrigeration, such as the low-pressure binary absorption system or apparatus of refrigeration or in any other proper apparatus of refrigeration, and subjected to the treatment of freezing for the purpose of separating the sugar dissolved in the liquid from the water of the liquid.

The process we prefer, and which we have found in practice to be best, is as follows: We place the clarified liquid or sugar-juice in a tin can, preferably of circular form, and in any desired quantity, having regard to the size of the refrigerating apparatus in which it is placed, and subject the said liquid to the freezing process. This process will cause the water and sugar of the liquid to separate, the water forming ice and the sugar concentrating in the center of the ice so formed and assuming the state of a thick sirup. When the sirup becomes so thick as to weigh from 41° to 43° Baumé, (specific gravity,) which is ascertained by testing, the sirup so formed is removed from the ice and subjected to a drying process, which is done by subjecting it to treatment in the centrifugal apparatus for drying, or in the evaporation apparatus, and the sugar is thus dried to such degree of dryness as is desired. After being subjected to this last process of drying it is then ready for use.

By our freezing process above set forth sugar is made which is superior in every respect to the sugar made by the processes at present in use. Our process is also more economical than those at present in use. The same process may be applied to molasses which has been made by any of the processes in common use, in order to concentrate and diminish the volume of the molasses in such degree as may be desired, for purposes of facility and economy of transportation.

Having thus described our invention, what we claim, and desire to secure by Letters Patent, is—

1. The above-described process for the fabrication of sugar, consisting in separating the sugar from the water of the liquid by freezing the liquid and drying the sugar, substantially as described.

2. The above-described process for the concentration of molasses, consisting of freezing the molasses for the purpose of concentrating and diminishing the volume of the same, substantially as described.

MIGUEL DE LA VEGA.
LUIZ D'OLIVEIRA.

In presence of—
CHARLES G. COE,
LEON OSIEL.